(12) United States Patent
Wang et al.

(10) Patent No.: US 9,715,617 B2
(45) Date of Patent: Jul. 25, 2017

(54) FINGERPRINT SENSOR

(71) Applicant: IMAGE MATCH DESIGN INC., Hsinchu (TW)

(72) Inventors: Ting-Sing Wang, Hsinchu County (TW); Yen-Kuo Lo, Tainan (TW)

(73) Assignee: IMAGE MATCH DESIGN INC., Hsinchu (TW)

( * ) Notice: Subject to any disclaimer, the term of this patent is extended or adjusted under 35 U.S.C. 154(b) by 339 days.

(21) Appl. No.: 14/525,829

(22) Filed: Oct. 28, 2014

(65) Prior Publication Data
US 2015/0346253 A1     Dec. 3, 2015

(30) Foreign Application Priority Data

May 30, 2014 (TW) ............................. 103118930 A
Jul. 4, 2014 (CN) ........................... 2014 1 0321384

(51) Int. Cl.
*G01R 27/26* (2006.01)
*G06K 9/00* (2006.01)
*G01D 5/24* (2006.01)

(52) U.S. Cl.
CPC ....... *G06K 9/00073* (2013.01); *G06K 9/0002* (2013.01); *G01D 5/24* (2013.01)

(58) Field of Classification Search
CPC ..... G01R 27/26; G01R 27/2605; G06F 3/044; G06F 2203/041; G06F 3/03547; G06F 3/041; G06F 3/0412; G06F 3/0414; G06F 3/0416; G06F 3/0418; G06F 3/046; G06F 3/047; G06F 2203/04107; G06F 2203/04111; G01D 5/24; G01D 5/241; G01D 5/2417; G01D 5/2405;
(Continued)

(56) References Cited

U.S. PATENT DOCUMENTS 7,099,497 B2 * 8/2006 Chou .................. G06K 9/0002
                                                              382/124
2007/0176868 A1 * 8/2007 Lee ..................... G02F 1/13306
                                                              345/87
(Continued)

FOREIGN PATENT DOCUMENTS

TW              583592         4/2004

*Primary Examiner* — Tung X Nguyen
*Assistant Examiner* — Robert P Alejnikov, Jr.
(74) *Attorney, Agent, or Firm* — WPAT, P.C., Intellectual Property Attorneys; Anthony King

(57) ABSTRACT

A fingerprint sensor includes a first reference capacitor, a second reference capacitor, a first capacitor and a second capacitor. A first reference voltage is established across the first reference capacitor. The first reference voltage is depended on a touch event, a first reference capacitance of the first reference capacitor and a stray capacitance. The second reference capacitor has a first end and a second end, and is being configured to maintain a voltage difference between the first end and the second end, the voltage difference being a function of the first reference voltage. The first capacitor has a first capacitance and is coupled to the first end. The second capacitor has a second capacitance and is selectively coupled in parallel with the first capacitor. The ratio of the stray capacitance to the first reference capacitance equals the ratio of the second capacitance to the first capacitance.

19 Claims, 12 Drawing Sheets

(58) Field of Classification Search
CPC ............ G06K 9/00073; H05K 9/0073; H05K 9/0079; H05K 9/0081; H05K 9/0088
USPC .......................... 324/658–663; 345/173–178
See application file for complete search history.

(56) References Cited

U.S. PATENT DOCUMENTS

| | | | | |
|---|---|---|---|---|
| 2009/0208069 A1* | 8/2009 | Chuang | ............... | G06K 9/0002 382/124 |
| 2011/0261005 A1* | 10/2011 | Joharapurkar | ........ | G06F 3/0418 345/174 |
| 2013/0257786 A1* | 10/2013 | Brown | ................... | G06F 3/044 345/174 |

* cited by examiner

FINGERPRINT SENSOR

TECHNICAL FIELD

The present invention relates in general to a fingerprint sensor and, in particular, to a fingerprint sensor including a cancellation circuit.

BACKGROUND

A capacitive-type fingerprint sensor is required to be sensitive enough to detect a capacitive signal, and robust enough to defend against electrostatic discharge (ESD). Accordingly, in designing a capacitive-type fingerprint sensor, sensing electrodes of relatively high capacitance and insulating layers having a relatively high dielectric constant and a relatively thin configuration are generally desirable. On the other hand, however, to provide reliable ESD protection, protection layers or ESD prevention mechanisms having a relatively large thickness may be required. As the thickness of a protection layer increases, the area of a sensing electrode decreases. It may thus be desirable to provide a fingerprint sensor that has high capacitance sensibility without compromising its ESD immunity.

SUMMARY

The present disclosure provides a fingerprint sensor to alleviate the above-mentioned issues. In an embodiment according to the present disclosure, a sensing circuit is provided to detect a capacitance from a touch event. Moreover, a cancellation circuit is provided to establish a voltage difference between a first end and a second end of a reference capacitor, in order to distinguish a finger valley contact from a finger ridge contact in the touch event.

The foregoing has outlined rather broadly the features and technical advantages of the present invention in order that the detailed description of the invention that follows may be better understood. Additional features and advantages of the invention will be described hereinafter, and form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

Embodiments, or examples, of the disclosure illustrated in the drawings are now described using specific languages. It will nevertheless be understood that no limitation of the scope of the disclosure is thereby intended. Any alterations and modifications in the described embodiments, and any further applications of principles described in this document are contemplated as would normally occur to one of ordinary skill in the art to which the disclosure relates. Reference numbers may be repeated throughout the embodiments, but this does not necessarily require that feature(s) of one embodiment apply to another embodiment, even if they share the same reference number.

It will be understood that when an element is referred to as being "connected to" or "coupled to" another element, it may be directly connected to or coupled to the other element, or intervening elements may be present.

Figure 1:
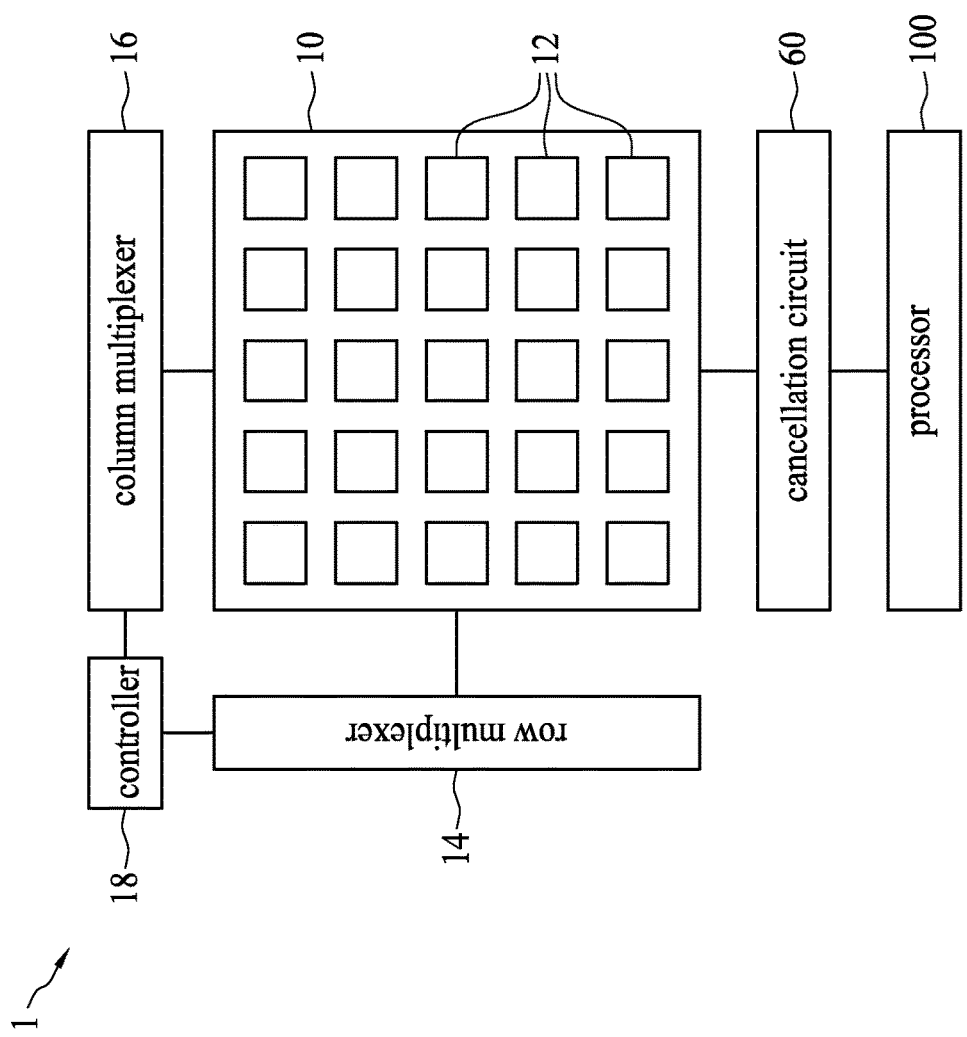

The objectives and advantages of the present invention are illustrated with the following description and upon reference to the accompanying drawings, in which:

FIG. 1 is a schematic block diagram of a fingerprint sensor, in accordance with embodiments of the present invention.

Figure 2A:
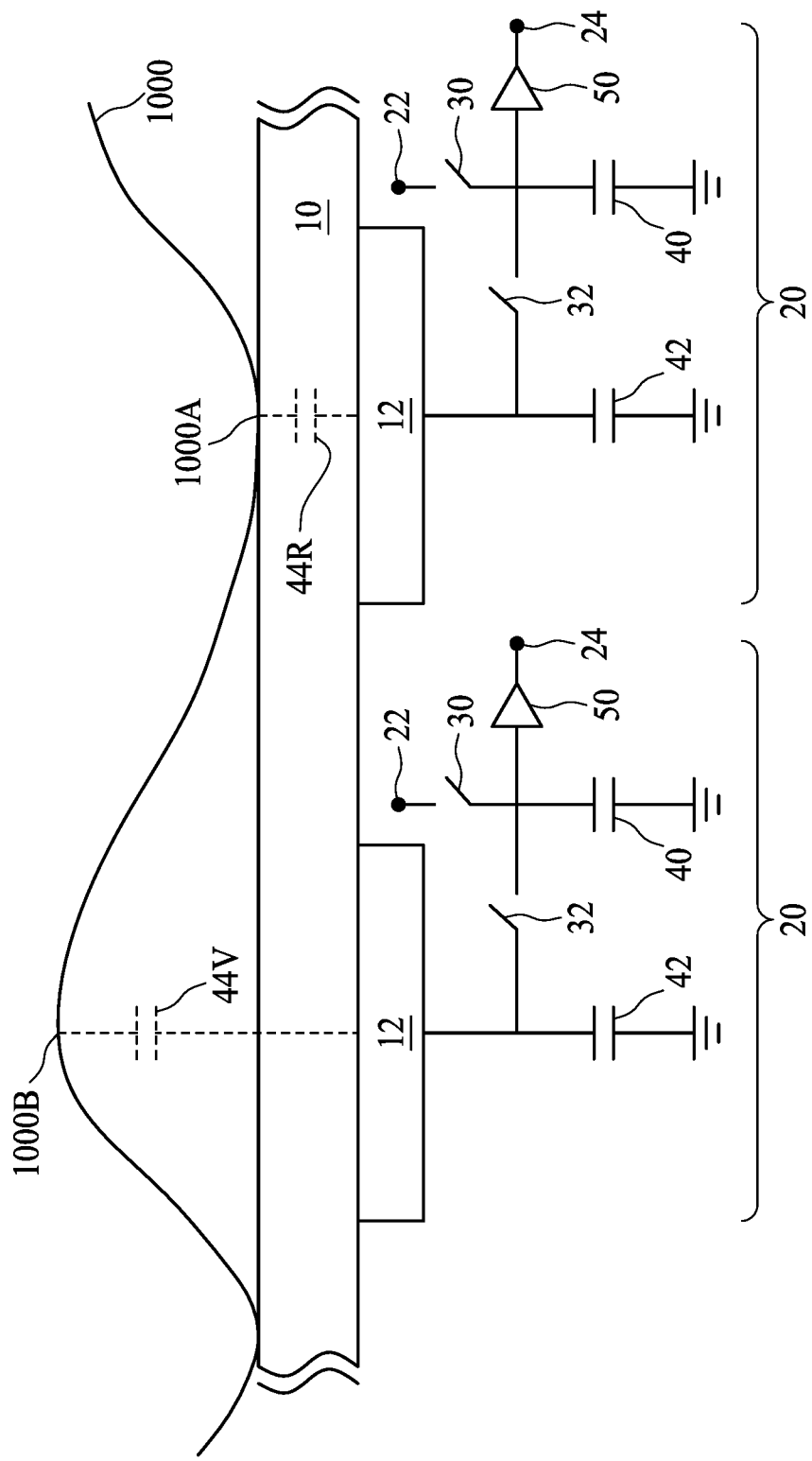

FIG. 2A is a schematic circuit diagram of a sensing circuit in the fingerprint sensor illustrated in FIG. 1, in accordance with some embodiments of the present invention.

Figure 2B:
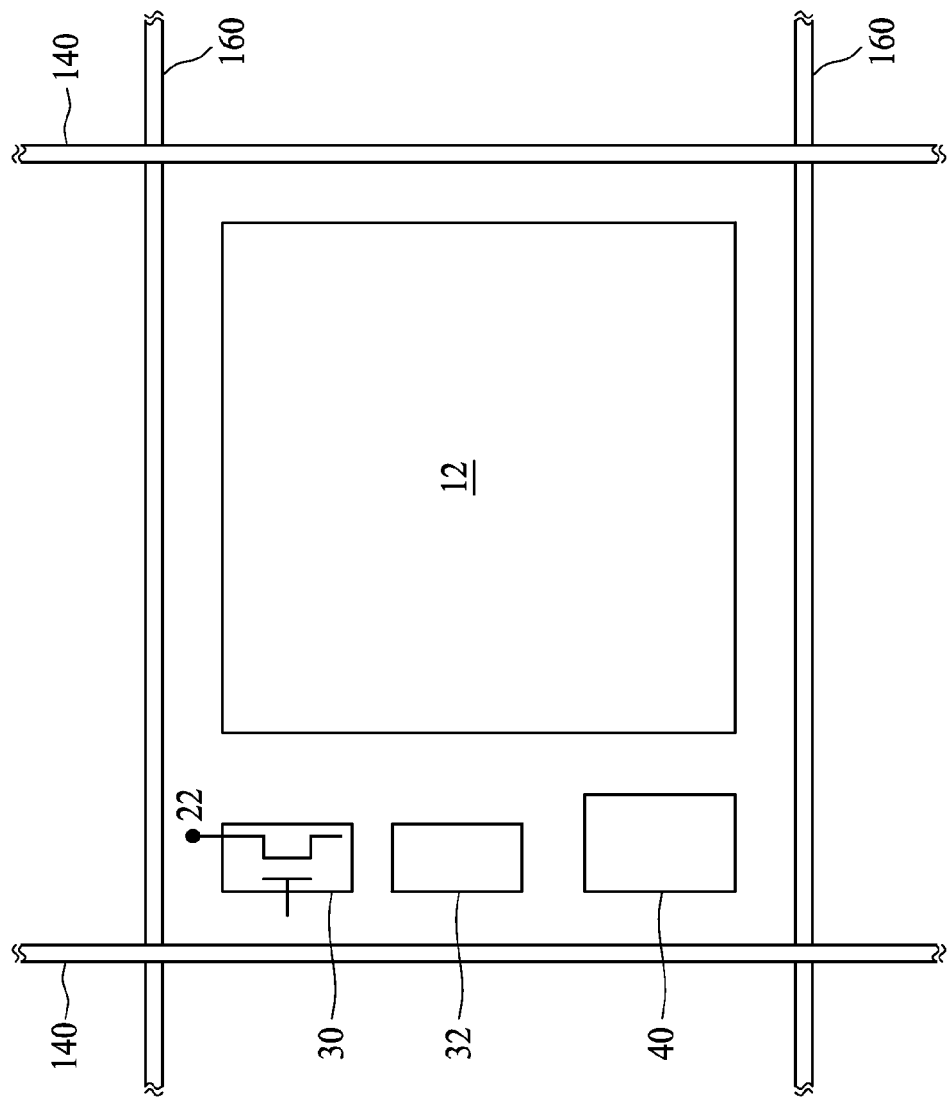

FIG. 2B is a diagram showing an exemplary layout of a sensing electrode and a reference capacitor in the fingerprint sensor illustrated in FIG. 1.

Figure 2C:
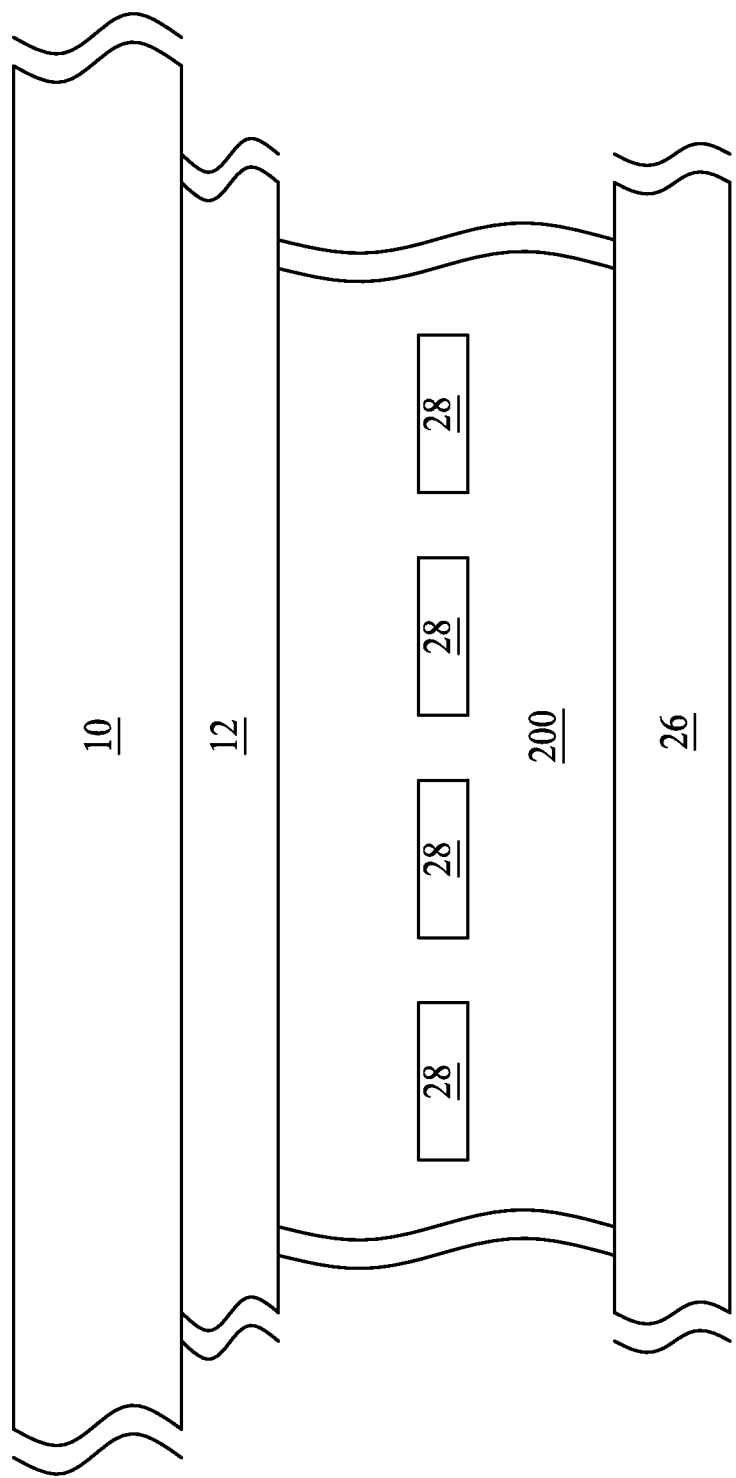

FIG. 2C is a schematic cross-sectional diagram showing floating electrodes in the fingerprint sensor illustrated in FIG. 1, in accordance with some embodiments of the present invention.

Figure 3:
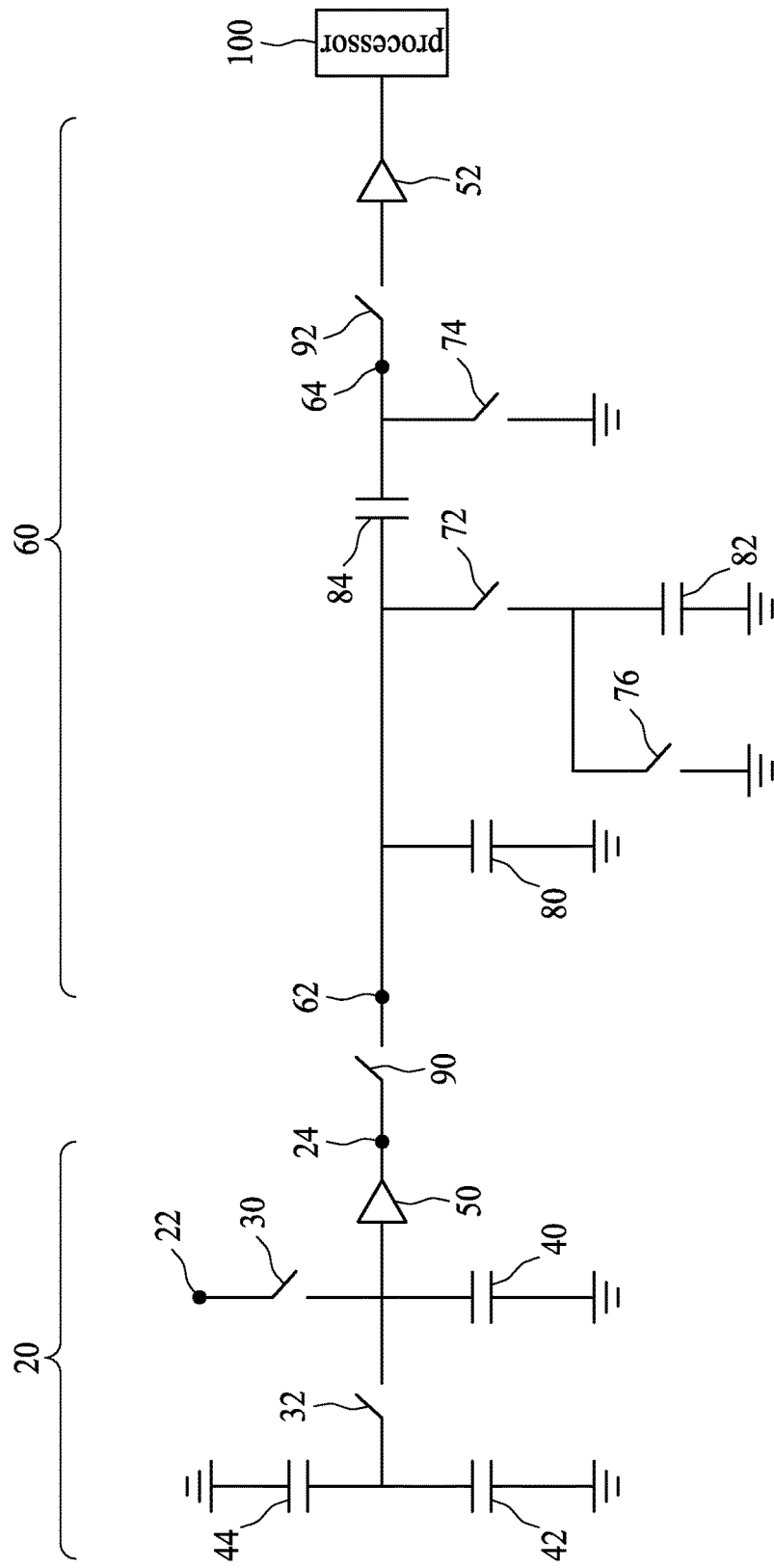

FIG. 3 is a circuit diagram of a cancellation circuit in the fingerprint sensor illustrated in FIG. 1, in accordance with some embodiments of the present invention.

FIGS. 4A to 4F are diagrams showing a method of operating a fingerprint sensor, in accordance with some embodiments of the present invention.

Figure 5:
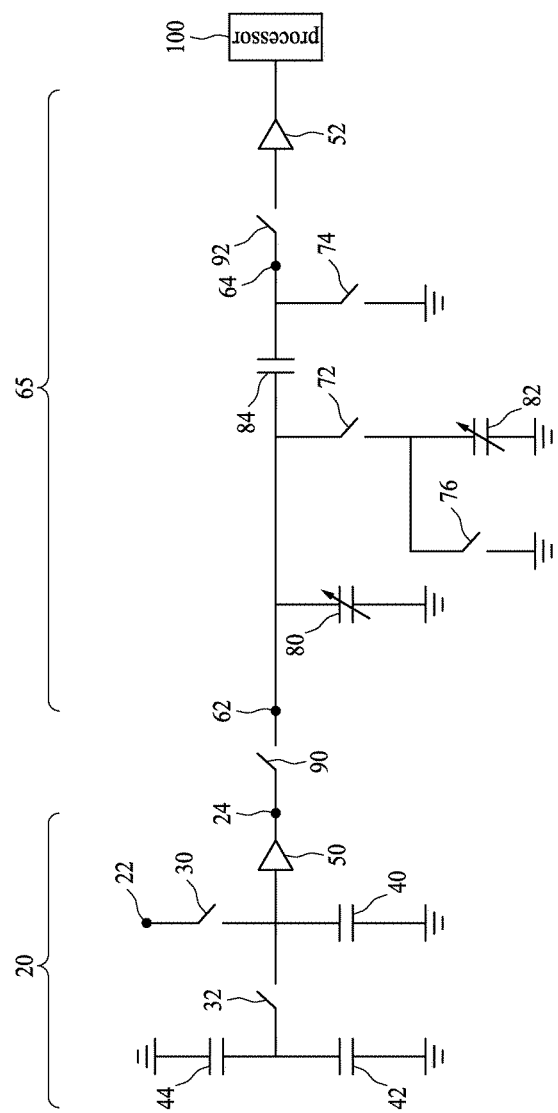

FIG. 5 is a circuit diagram of a cancellation circuit in the fingerprint sensor illustrated in FIG. 1, in accordance with some embodiments of the present invention.

DETAILED DESCRIPTION

The embodiments of the present invention are shown in the following description with the drawings, wherein similar or same components are indicated by similar reference numbers.

FIG. 1 is a schematic block diagram of a fingerprint sensor 1, in accordance with embodiments of the present invention. Referring to FIG. 1, the fingerprint sensor 1 includes sensing electrodes 12, a row multiplexer 14, a column multiplexer 16, a controller 18, a cancellation circuit 60 and a processor 100.

The sensing electrodes 12, protected by an insulating layer 10, are arranged in rows and columns in an array. Each of the sensing electrodes 12 serves as a pixel and functions to detect a capacitance in response to a touch event on the insulating layer 10.

The row multiplexer 14, electrically connected to the array of sensing electrodes 12, is configured to send signals from the sensing electrodes 12 to the cancellation circuit 60 in a predetermined sequence under the control of the controller 18.

Likewise, the column multiplexer 16, electrically connected to the array of sensing electrodes 12, is configured to send signals from the sensing electrodes 12 to the cancellation circuit 60 in a predetermined sequence under the control of the controller 18.

The cancellation circuit 60 is configured to alleviate capacitance effects of stray or parasitic capacitors so as to facilitate the processor 100 to distinguish finger ridges from finger valleys in a touch event. The cancellation circuit 60 will be discussed in detail with reference to FIGS. 3 and 4A to 4F.

FIG. 2A is a schematic circuit diagram of a sensing circuit 20, in accordance with some embodiments of the present invention. Referring to FIG. 2A, two exemplary sensing circuits 20 are illustrated. Each of the sensing circuits 20 includes a first reference capacitor 40, switches 30 and 32, a sensing electrode 12 and an amplifier 50.

The first reference capacitor 40 includes a first end (not numbered) coupled to the switch 30, and a second end (not numbered) coupled to a reference voltage, for example, ground. When the switch 30 is closed (conductive), the first reference capacitor 40 receives a voltage applied at an input node 22 of the sensing circuit 20. When the switch 30 is opened (not conductive), the first reference capacitor 40 is disconnected from the node 22.

The sensing electrode 12, disposed under the insulating layer 10, is configured to detect a capacitance in response to a touch from a finger 1000 on the insulating layer 10. In a touch event, a finger ridge 1000A of the finger 1000 physically contacts the insulating layer 10, resulting in a capacitance 44r between the sensing electrode 20 (on the right side, in FIG. 2) and the finger ridge 1000A. Moreover, a finger valley 1000B of the finger 1000 does not physically contact the insulating layer 10, resulting in a capacitance 44v between the sensing electrode 20 (on the left side, in FIG. 2) and the finger valley 1000B. Since capacitance is inversely proportional to distance, the capacitance 44v is smaller than the capacitance 44r. The capacitances 44r and 44v are represented by capacitors 44R and 44V, respectively, which in turn are collectively referred to as capacitor 44. Moreover, the finger 1000 can be regarded as a reference ground. As a result, the capacitor 44 is deemed to be connected between the sensing electrode 12 and a reference voltage. Specifically, the capacitor 44 includes a first end (not numbered) coupled via the switch 32 to the first end of the first reference capacitor 40, and a second end (not numbered) coupled to a reference voltage.

To precisely determine the capacitances 44v and 44r, capacitance effects caused by stray capacitance or parasitic capacitance, which may exist between the sensing electrode 12 and wiring lines in the sensing circuit 20, are taken into consideration in the present disclosure. The stray capacitance is represented by a capacitor 42 connected between the sensing electrode 12 and a reference voltage. The stray capacitor 42 includes a first end (not numbered) coupled to the first end of the capacitor 44 and coupled via the switch 32 to the first end of the first reference capacitor 40, and a second end (not numbered) coupled to a reference voltage.

The amplifier 50 includes an input coupled to the first end of the first reference capacitor 40, and an output 24 which serves as an output node of the sensing circuit 20. In an embodiment, the amplifier 50 includes a current mirror (not shown) and a source follower (not shown).

FIG. 2B is a diagram showing an exemplary layout of the sensing electrode 12 and the first reference capacitor 40 in the fingerprint sensor illustrated in FIG. 2A. Referring to FIG. 2B, the sensing electrode 12 is disposed in a pixel area defined by immediately adjacent row scan lines 140 and immediately adjacent column scan lines 160. The row scan lines 140 and the column scan lines 160 are coupled to the row multiplexer 14 and column multiplexer 16, respectively, and are substantially orthogonal to each other. Moreover, the first reference capacitor 40 and the switches 30 and 32 are disposed near the sensing electrode 12 in the pixel region. In some embodiments, the switches 30 and 32 may take the form of a transistor. In an embodiment, the sensing electrode 12, the first reference capacitor 40 and the switches 30 and 32 do not overlap one another. With such non-overlapping arrangement, stray capacitance that would otherwise exist under the sensing electrode 12 can be avoided.

FIG. 2C is a schematic cross-sectional diagram showing floating electrodes 28 in the fingerprint sensor 1 illustrated in FIG. 1, in accordance with some embodiments of the present invention. Referring to FIG. 2C, the sensing circuit 20 includes a substrate 26 and multiple floating electrodes 28 in an insulating layer 200 between the substrate 26 and the sensing electrode 12. The floating electrodes 28 function to shield off stray capacitance between the sensing electrode 12 and the substrate 26 so as protect the capacitor 44 from the stray capacitance and reduce the stray capacitance represented by the stray capacitor 42. In an embodiment, the floating electrodes 28 include metal electrodes. In some embodiments, the first reference capacitor 40 includes a transistor-type capacitor, wherein gate, gate oxide and substrate of a transistor form the capacitor. Effectively, by manufacturing the first reference capacitor 40 based on the thin gate oxide in a metal-oxide-semiconductor (MOS) transistor, the first reference capacitor 40 can have a reduced size and an increased capacitance. In addition, as the size of the first reference capacitor 40 is reduced, the size of the sensing electrode 12 in a pixel are can be increased, thereby increasing the capacitance of the capacitor 44. As a result, by means of the floating electrodes 28 and the thin gate oxide properties, the first reference capacitor 40 can be designed with a larger capacitance, and the sensing electrode 12 can be designed with a larger size to facilitate detecting a larger capacitance represented by the capacitor 44. Moreover, the stray capacitance effects can be alleviated and the stray capacitance represented by the stray capacitor 42 can be reduced.

FIG. 3 is a circuit diagram of a fingerprint sensor, in accordance with some embodiments of the present invention. Referring to FIG. 3, the fingerprint circuit includes a sensing circuit 20 and a cancellation circuit 60.

The cancellation circuit 60 includes a second reference capacitor 84, a first capacitor 80 and a second capacitor 82. The cancellation circuit 60 is selectively couple at an input node 62 to the output node 24 of the sensing circuit 20 via a switch 90. Moreover, the cancellation circuit 60 is selectively coupled at an output node 64 to the processor 100 via a switch 92. In the present embodiment, an amplifier 52 is optionally coupled between the switch 92 and the processor 100 to facilitate signal analysis at the processor 100.

The second reference capacitor 84 includes a first end coupled to the input node 62, and a second end coupled the output node 64. Moreover, the second end of the second reference capacitor 84 is selectively configured to ground via a switch 74.

The first capacitor 80 includes a first end coupled to the first end of the second reference capacitor 84, and a second end coupled to ground.

The second capacitor 82 includes a first end selectively coupled to the first end of the second reference capacitor 84 via a switch 72, and selectively coupled to ground via a switch 76. Furthermore, the second capacitor 82 includes a second end coupled to ground.

FIGS. 4A to 4F are diagrams showing a method of operating a fingerprint sensor, in accordance with some embodiments of the present invention. Referring to FIG. 4, initially, the sensing circuit 20 is decoupled from the cancellation circuit 60 by opening (not conducting) the switch 90. Moreover, the cancellation circuit 60 is decoupled from the processor 100 by opening the switch 92. In operation, by opening the switch 32 while closing (conducting) the switch 30, the first reference capacitor 40 is charged by a first voltage V1 applied to the node 22. Subsequently, in some embodiments, a voltage V40 substantially equal to the first voltage V1 is established across the first reference capacitor 40. Charge stored in the first reference capacitor 40 is expressed in equation (1) below.

$$Q40 = V40 \times C40 \quad \text{equation (1)}$$

where Q40 represents the stored charge, and C40 represents the capacitance of the first reference capacitor 40.

During the charging stage of the first reference capacitor 40, in an embodiment, the switches 72, 74 and 76 are closed so that the second reference capacitor 84, the first capacitor 80 and the second capacitor 82 are discharged to ground to ensure no residual charge remained.

Figure 4A:
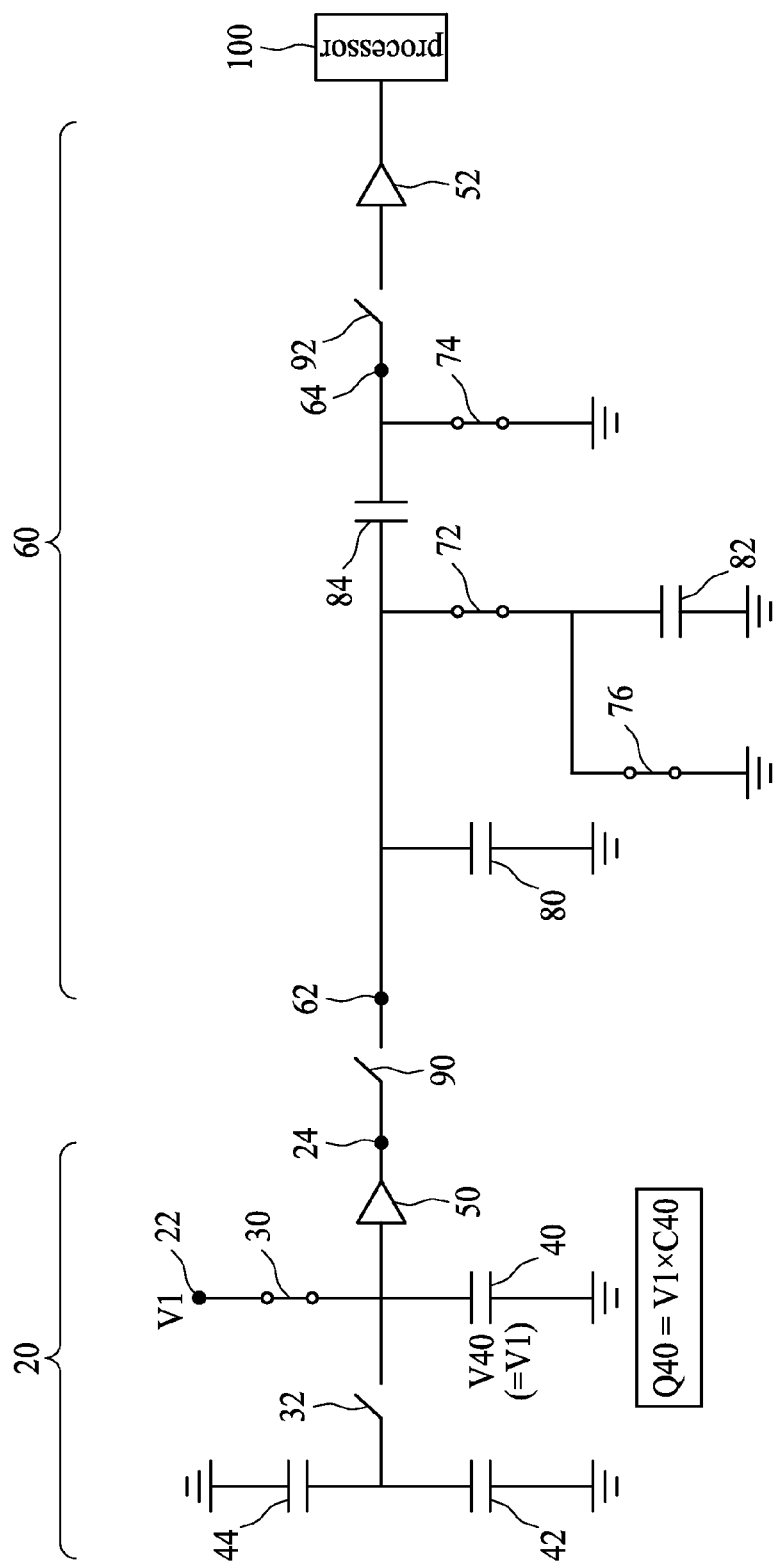
Figure 4B:
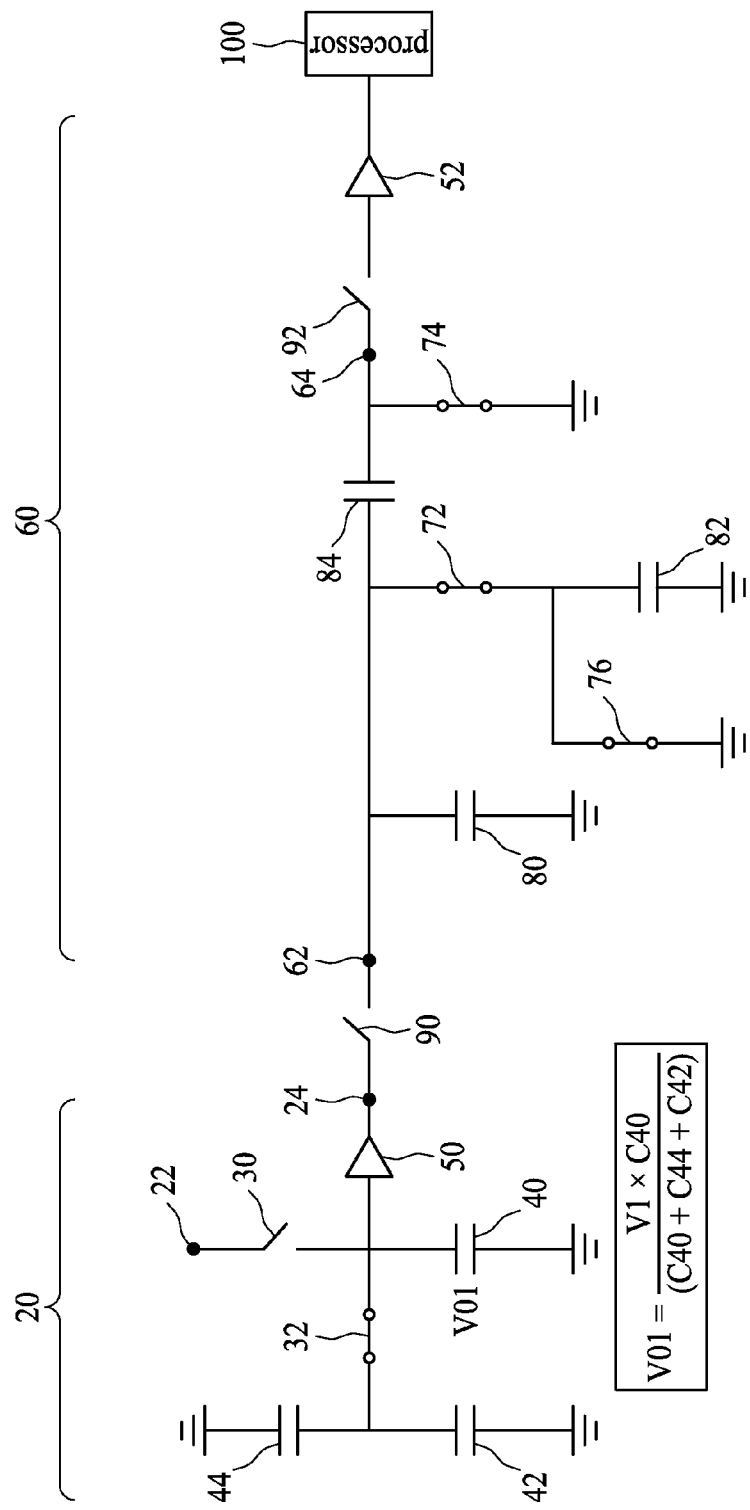

Referring to FIG. 4B, as compared to FIG. 4A, by closing the switch 32 while opening the switch 30, the charge Q40 stored in the first reference capacitor 40 is shared among the first reference capacitor 40, the sensing capacitor 44 and the stray capacitor 42 in a first charge sharing event. After the first charge sharing event, a first reference voltage V01 across the first reference capacitor 40 is established, as expressed in equation (2) below.

$$V01 = \frac{Q40}{(C40 + C44 + C42)} = \frac{V1 \times C40}{(C40 + C44 + C42)} \qquad \text{equation (2)}$$

where C44 represents the capacitance of the sensing capacitor 44, and C42 represents the capacitance of the stray capacitor 42.

According to equation (2), the first reference voltage V01 is a function of the capacitance C40 of the first reference capacitor 40, the capacitance C44 of the sensing capacitor 44 and the capacitance C42 of the stray capacitor 42.

Figure 4C:
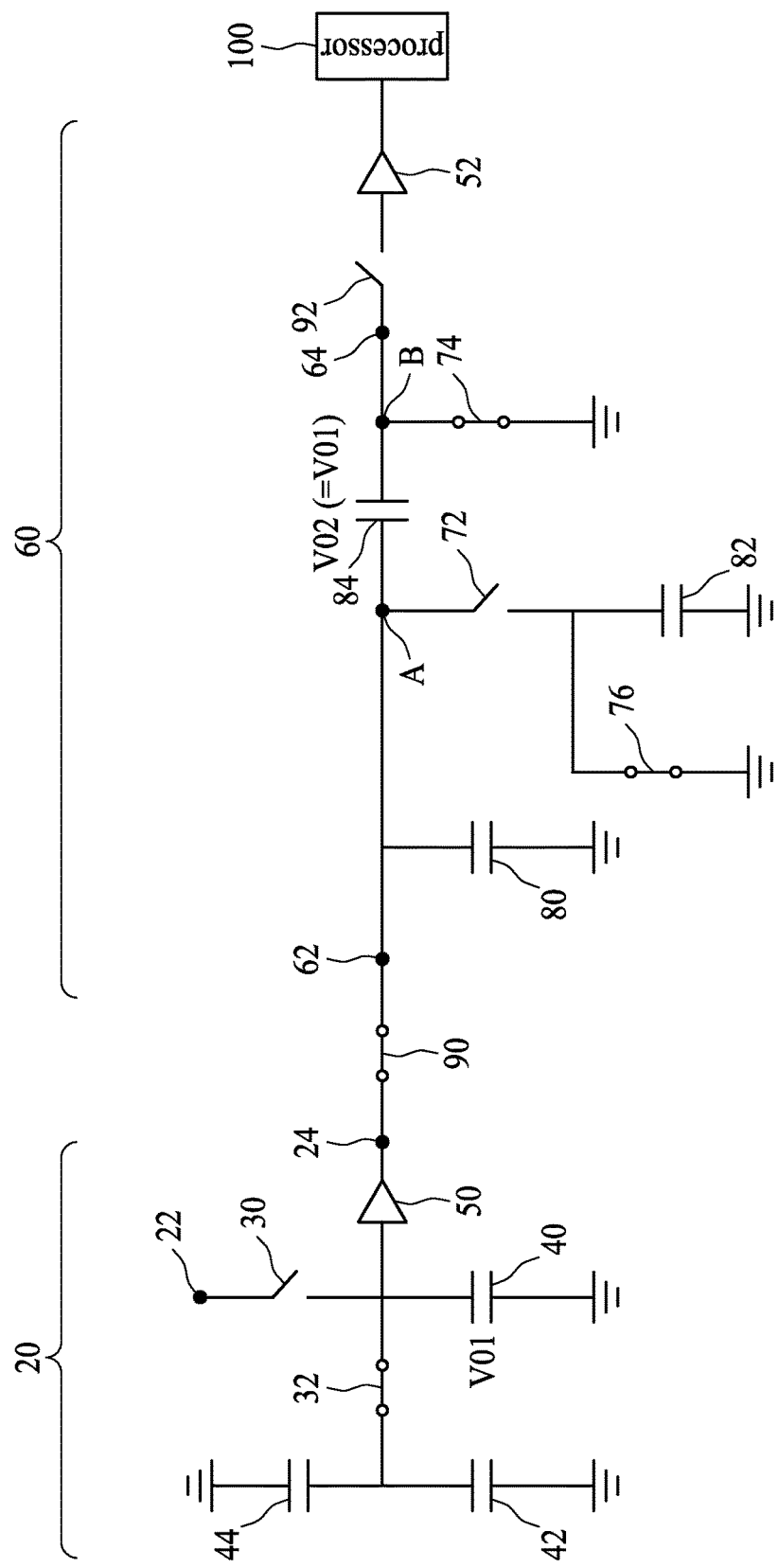

Referring to FIG. 4C, as compared to FIG. 4B, the switch 90 is closed, coupling the sensing circuit 20 to the cancellation circuit 60. Moreover, the switch 72 is opened, decoupling the second capacitor 82 from the second reference capacitor 84. By function of the amplifier 50, a second reference voltage V02, which is a function of the first reference voltage V01, is established across the second reference capacitor 84. In an embodiment according to the present invention, the amplifier 50 includes a source follower that provides a voltage gain of approximately one. As a result, the second reference voltage V02 across the second reference capacitor 84 is substantially equal to the first reference voltage V01. Specifically, the voltage level at one end (node A) of the second reference capacitor 84 is V01, and the voltage level at the other end (node B) of the second reference capacitor 84 is zero.

Figure 4D:
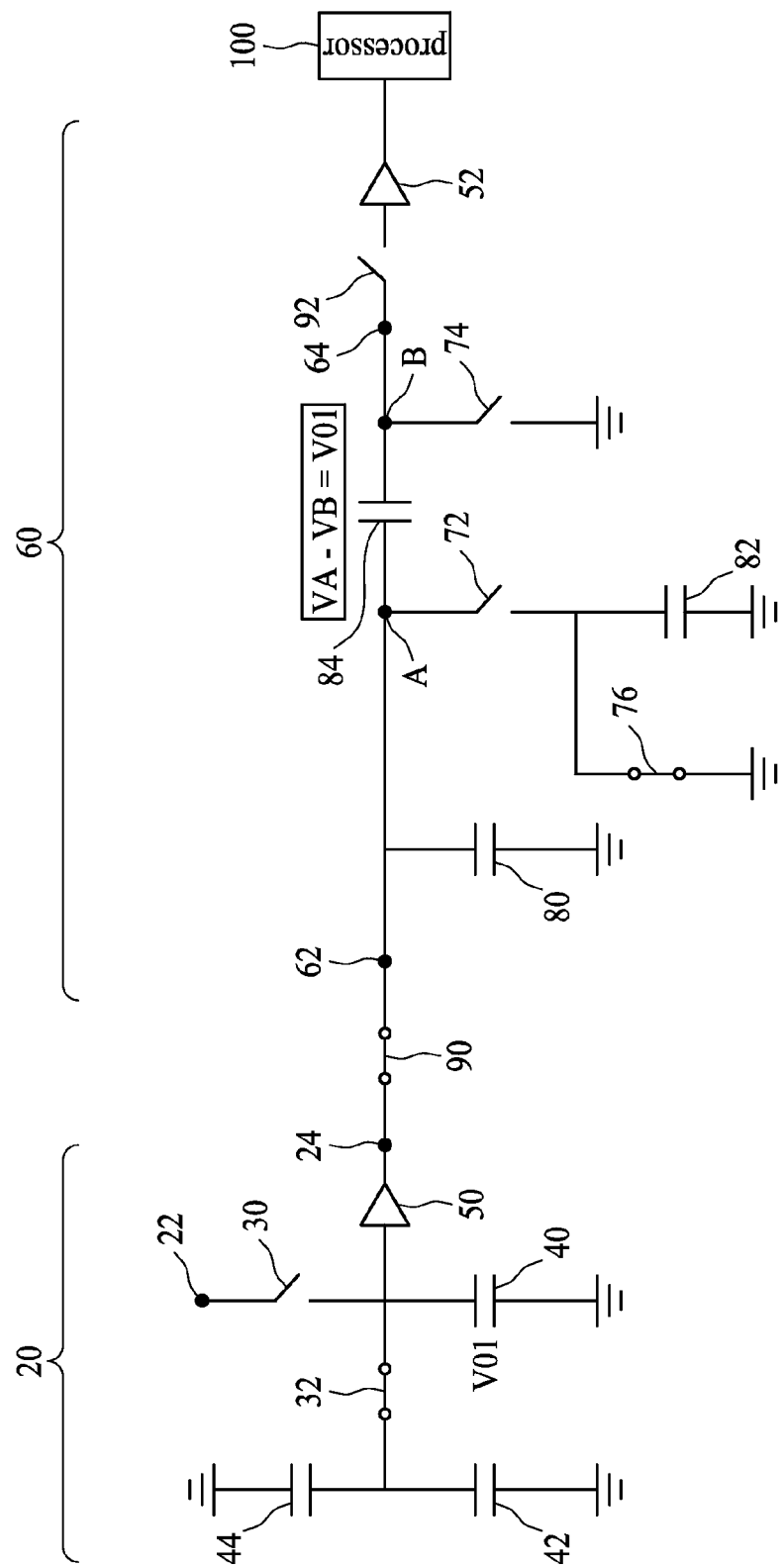

Subsequently, to sample the voltage across the second reference capacitor 84, referring to FIG. 4D, the switch 74 is opened. As a result, the second reference capacitor 84 can no longer be charged or discharge so that the voltage across the second reference capacitor 84 is maintained at V02. That is, the voltage difference between node A and node B is kept at the second reference voltage V02.

Figure 4E:
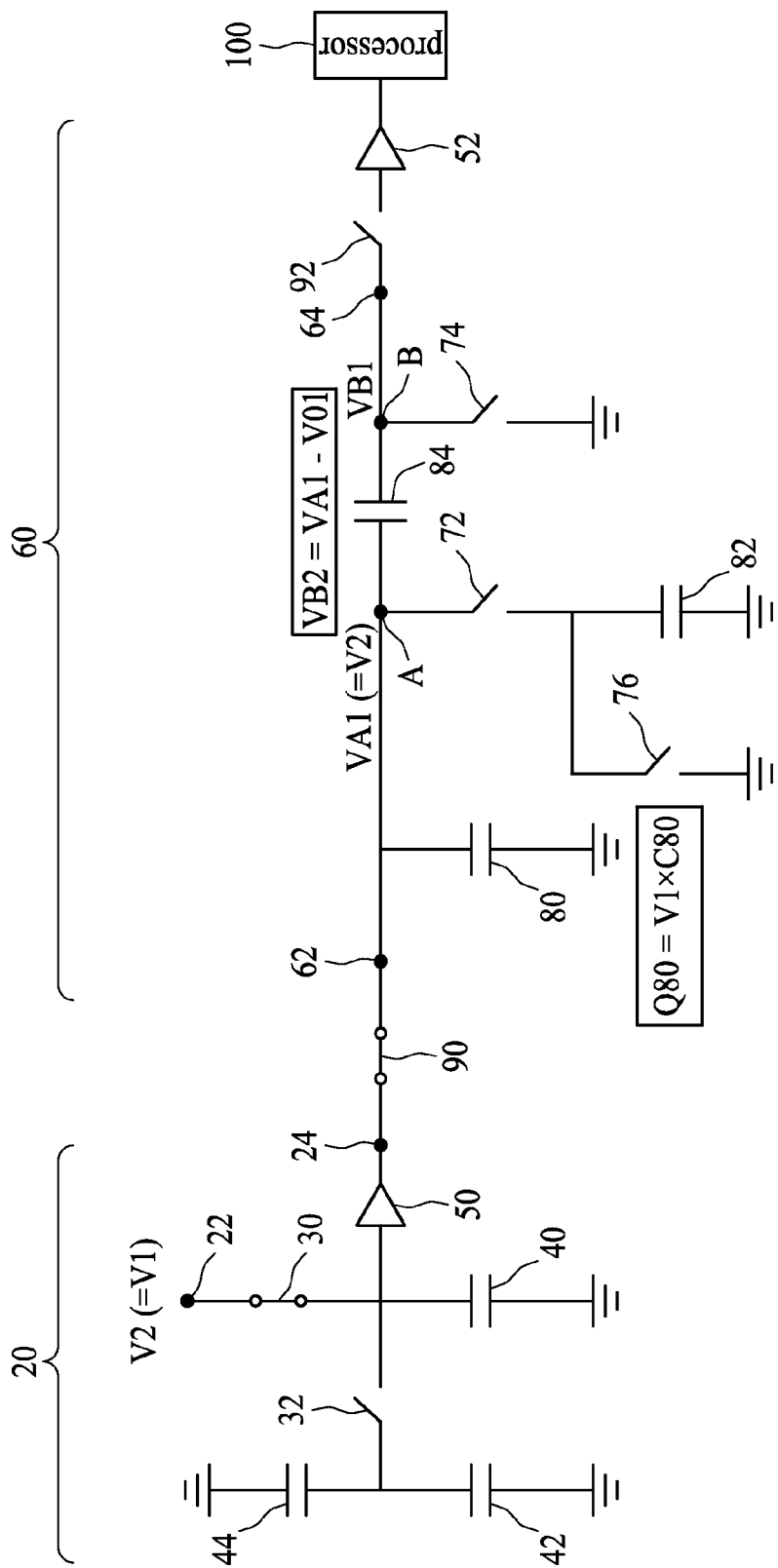

Referring to FIG. 4E, after the voltage difference V02 is sampled, by closing the switch 30 while opening the switch 32, the first reference capacitor 40 is charged by a second voltage V2 applied to the node 22. In an embodiment, the second voltage V2 is substantially equal to the first voltage V1. Meanwhile, the first capacitor 80 is charged by an amplified voltage via the amplifier 50. In an embodiment that the voltage gain of the amplifier 50 is approximately one, charge stored in the first capacitor 80 is expressed in equation (3) below.

$$Q80 = V2 \times C80 \qquad \text{equation (3)}$$

where Q80 represents the stored charge, and C80 represents the capacitance of the first capacitor 80.

Furthermore, since the switch 90 is closed, by function of the amplifier 50, the voltage level (currently VA1) at node A is pulled up from V01 to V2, denoted as VA1=V2. Moreover, since the voltage difference between node A and node B is kept at the sampled voltage V02, the voltage level (currently VB1) at node B is pulled up from zero to (VA1-V02). Given in some embodiments V1=V2 and V01=V02, VB1 can be expressed in equation (4) below.

$$VB1 = VA1 - V02 = \frac{V1 \times (C44 + C42)}{(C40 + C44 + C42)} \qquad \text{equation (4)}$$

In an deal case, the stray capacitance C42 can be negligible and assumed to be zero. Accordingly, voltages Videal-r and Videal-v associated with a finger ridge contact and a finger valley contact, respectively, in a touch event are expressed in equations (5a) and (5b) below.

$$Videal\text{-}r = \frac{V1 \times C44r}{(C40 + C44r)} \qquad \text{equation (5a)}$$

$$Videal\text{-}v = \frac{V1 \times C44v}{(C40 + C44v)} \qquad \text{equation (5b)}$$

where C44r represents the capacitance of the sensing capacitor 44 in response to a finger ridge contact, and C44v represents the capacitance of the sensing capacitor 44 in response to a finger valley contact during a touch event.

Since the capacitance C44v is so small that the voltage Videal-v is negligible, a significant difference therefore exists between the voltages Videal-r and Videal-v, which can be easily detected. As such, images of finger ridges and finger valleys are effectively distinguished from one another.

In a normal case, however, the stray capacitance C42 in equation (4) is not negligible. As a result, in some existing approaches, the difference between measured signals, such as voltage levels, associated with a finger ridge contact and a finger valley contact is insignificant, which may lead to poor image resolution or non-uniform grayscale. To alleviate the stray capacitance effect, a cancellation circuit is thus desirable.

Figure 4F:
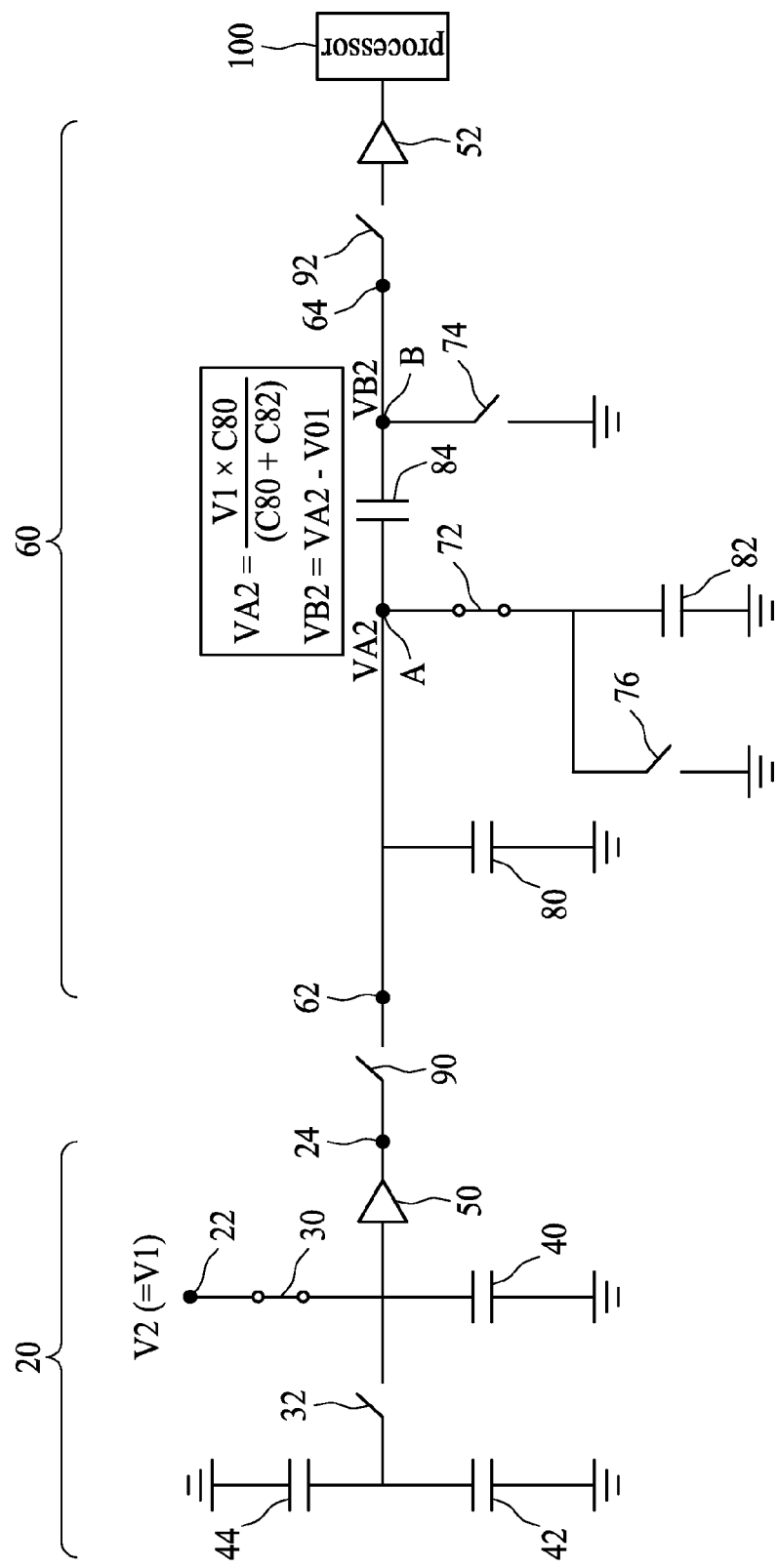

Referring to FIG. 4F, as compared to FIG. 4E, the switch 90 is opened, electrically decoupling the cancellation circuit 60 from the sensing circuit 20. Moreover, the switch 72 is closed, electrically coupling the second capacitor 82 in parallel with the first capacitor 80.

As the first capacitor 80 and the second capacitor 82 are connected in parallel, the charge Q80 stored in the first capacitor 80 is shared by the first capacitor 80 and the second capacitor 82 in a second charge sharing event. After the second charge sharing event, the voltage level at node A is pulled down from VA1 to VA2, which is expressed in equation (6) below.

$$VA2 = \frac{Q80}{(C80 + C82)} \qquad \text{equation (6)}$$

Substituting Q80 by V2×C80 as expressed in equation (3), given V1=V2, equation (6) is rewritten as equation (7) below.

$$VA2 = \frac{V1 \times C80}{(C80 + C82)} \qquad \text{equation (7)}$$

Moreover, since the voltage difference between node A and node B is kept at the sampled voltage V02, the voltage level at node B is pulled down from VB1 to VB2, which is expressed in equation (8) below, based on equations (2) and (7).

$$VB2 = VA2 - V02 = \frac{V1 \times C80}{(C80 + C82)} - \frac{V1 \times C40}{(C40 + C44 + C42)} \quad \text{equation (8)}$$

Substituting $$\frac{V1 \times C80}{(C80 + C82)} \text{ by } V1 - \frac{V1 \times C82}{(C80 + C82)},$$

equation (8) is rewritten as equation (9) below.

$$VB2 = \frac{V1 \times (C44 + C42)}{(C40 + C44 + C42)} - \frac{V1 \times C82}{(C80 + C82)} \quad \text{equation (9)}$$

As compared to equation (4), equation (9) provides a solution to alleviate the stray capacitance effect. Specifically, the second term, $$-\frac{V1 \times C82}{(C80 + C82)},$$

in equation (9) facilitates removal of the stray capacitance C42, which will be further explained.

By closing the switch 92, the voltage VB2 is sent to the processor 100 for analysis. In some embodiments, the voltage VB2 is amplified by the amplifier 52 before sent to the processor 100.

In response to a finger ridge contact, capacitance C44r exists between a sensing electrode and a finger ridge associated with the sensing electrode. In that case, equation (9) is rewritten as:

$$VB2r = \frac{V1 \times (C44r + C42)}{(C40 + C44r + C42)} - \frac{V1 \times C82}{(C80 + C82)} \quad \text{equation (10)}$$

On the other hand, In response to a finger valley contact, capacitance C44v exists between a sensing electrode and a finger valley associated with the sensing electrode. In that case, equation (9) is rewritten as:

$$VB2v = \frac{V1 \times (C44v + C42)}{(C40 + C44v + C42)} - \frac{V1 \times C82}{(C80 + C82)} \quad \text{equation (11)}$$

Since the capacitance C44v is much smaller than the capacitance C40 and the stray capacitance C42, the capacitance C44v in equation (11) is negligible. Equation (11) is simplified as:

$$VB2v = \frac{V1 \times (C42)}{(C40 + C42)} - \frac{V1 \times C82}{(C80 + C82)} \quad \text{equation (11a)}$$

In some embodiments, the ratio of capacitance C82 to capacitance C80 is equal to the ratio of capacitance C42 to capacitance C40, denoted as $$\frac{C82}{C80} = \frac{C42}{C40} = k,$$

k being a positive number. In equation (11a), since $$\frac{C42}{(C40 + C42)} = \frac{C82}{(C80 + C82)} = \frac{k}{k+1},$$

VB2v is reduced to zero. Moreover, VB2r in equation (10) can be rewritten as follows.

$$VB2r = \frac{V1 \times C44r \times C80)}{(C40 + C44r + C42) \times (C80 + C82)} = \quad \text{equation (10a)}$$
$$\frac{V1 \times C44r}{(C40 + C44r + C42) \times (1 + k)}$$

Since VB2r is significantly different from VB2v that is substantially zero, the processor 100 can easily distinguish a finger ridge from a finger valley. Effectively, the fingerprint sensor 1 according to the present invention can alleviate or overcome the issues of poor image resolution and non-uniform grayscale that would occur in some existing approaches.

In an embodiment, also referring to FIG. 1, each row of the electrode array is coupled to an individual cancellation circuit 60. As a result, adjustment can be made to the first capacitor 80 and/or the second capacitor 82 in each cancellation circuit 60 with respect to the electrical properties associated with the row of sensing electrodes 12. Effectively, the definition of image is enhanced and the accuracy of the fingerprint sensor 1 is improved.

In another embodiment, each column of the electrode array is coupled to an individual cancellation circuit 60. As a result, adjustment can be made to the first capacitor 80 and/or the second capacitor 82 in each cancellation circuit 60 with respect to the electrical properties associated with the column of sensing electrodes 12. Effectively, the definition of image is enhanced and the accuracy of the fingerprint sensor 1 is improved.

In yet another embodiment, each sensing electrode 12 is coupled to an individual cancellation circuit 60.

FIG. 5 is a circuit diagram of a cancellation circuit 65 in the fingerprint sensor 1 illustrated in FIG. 1, in accordance with some embodiments of the present invention. Referring to FIG. 5, the cancellation circuit 65 is similar to the cancellation circuit 60 described and illustrated with reference to FIG. 3 except, for example, the first capacitor 80 and the second capacitor 82.

In an embodiment, the first capacitor 80 has an adjustable capacitance. By adjusting the capacitance of the first capacitor 80, the ratio $$\frac{C82}{C80}$$

and thus the value of k can be adjusted to reduce the value of VB2v in equation (11a) to zero so as to distinguish a finger valley contact from a finger ridge contact in a touch event.

In another embodiment, the second capacitor 82 has an adjustable capacitance. By adjusting the capacitance of the second capacitor 82, the ratio $$\frac{C82}{C80}$$

and thus the value of k can be adjusted to reduce the value of VB2v in equation (11a) to zero so as to distinguish a finger valley contact from a finger ridge contact in a touch event.

In yet another embodiment, each of the first capacitor 80 and the second capacitor 82 has an adjustable capacitance. By adjusting either the capacitance of the first capacitor 80 or the capacitance of the second capacitor 82 or both, the ratio $$\frac{C82}{C80}$$

and thus the value of k can be adjusted to reduce the value of VB2v in equation (11a) to zero so as to distinguish a finger valley contact from a finger ridge contact in a touch event.

To facilitate making the ratio $$\frac{C82}{C80}$$

equal to the ratio $$\frac{C42}{C40},$$

by fabrication the types of the first capacitor 80 and the second capacitor 82 are selected as the same or similar types of the first reference capacitor 40 and the stray capacitor 42. For example, the first reference capacitor 40 is a transistor-type capacitor, and the stray capacitor 42 is a plate-type capacitor. Accordingly, the second capacitor 82 is a transistor-type capacitor and the first capacitor is a plate-type capacitor. Manufacturing offset associated with the capacitors can thus be simulated and hence be compensated by the cancellation circuit 60. In some embodiments, in addition to the transistor-type capacitor, the second capacitor 82 may include but is not limited to a polysilicon-insulator-polysilicon (PIP) capacitor or a metal-insulator-metal (MIM) capacitor.

Embodiments according to the present disclosure provide a fingerprint sensor that comprises a sensing circuit and a cancellation circuit. The sensing circuit includes a sensing electrode to detect a capacitance in response to a touch event, and a first reference capacitor across which a first reference voltage is established, the first reference voltage being a function of the capacitance, a first reference capacitance of the first reference capacitor and a stray capacitance. The cancellation circuit, selectively coupled to the sensing circuit, includes a second reference capacitor, a first capacitor and a second capacitor. The second reference capacitor, including a first end and a second end, receives a second reference voltage that is a function of the first reference voltage. A voltage difference between the first end and the second end is equal to the second reference voltage. The first capacitor is coupled to the second reference capacitor. Moreover, the second capacitor is selectively coupled in parallel with the first capacitor and configured to, in conjunction with the first capacitor, distinguish a voltage level at the second end of the second reference capacitor in response to a finger valley contact from a voltage level in response to a finger ridge contact at the second end of the second reference capacitor in the touch event.

In an embodiment, the fingerprint sensor further comprises an amplifier between the sensing circuit and the cancellation circuit. The amplifier includes a source follower.

In another embodiment, the second reference voltage equals the first reference voltage.

In still another embodiment, the first reference capacitor is configured to receive a first voltage V1, and the first reference voltage V01 is expressed as:

$$V01 = \frac{V1 \times C40}{(C40 + C44 + C42)}$$

where C40, C44 and C42 represent the first reference capacitance, the capacitance and the stray capacitance, respectively.

In yet another embodiment, the first capacitor and the second capacitor are configured to cause a voltage level VA2 at the first end of the second reference capacitor and a voltage level VB2 at the second end of the second reference capacitor to be:

$$VA2 = \frac{V1 \times C80}{(C80 + C82)}, \text{ and}$$

$$VB2 = \frac{V1 \times C80}{(C80 + C82)} - \frac{V1 \times C40}{(C40 + C44 + C42)},$$

respectively,
where C80 and C82 represent a first capacitance of the first capacitor, and a second capacitance of the second capacitor, respectively.

In yet still another embodiment, a voltage level VB2v at the second end of the second reference capacitor in response to the finger valley contact and a voltage level VB2r at the second end of the second reference capacitor in response to the finger ridge contact are expressed as:

$$VB2v = \frac{V1 \times (C44v + C42)}{(C40 + C44v + C42)} - \frac{V1 \times C82}{(C80 + C82)}, \text{ and}$$

$$VB2r = \frac{V1 \times (C44r + C42)}{(C40 + C44r + C42)} - \frac{V1 \times C82}{(C80 + C82)},$$

respectively,
where C44v and C44r represent a capacitance detected in response to the finger valley contact and a capacitance detected in response to the finger ridge contact, respectively.

In an embodiment, the ratio of the stray capacitance to the first reference capacitance equals the ratio of a second capacitance of the second capacitor to a first capacitance of the first capacitor.

In another embodiment, the fingerprint sensor further comprises floating electrodes between a substrate and an electrode array including the sensing electrode.

In still another embodiment, at least one of the first capacitor or the second capacitor has an adjustable capacitance.

In yet still another embodiment, the second capacitor includes one of a polysilicon-insulator-polysilicon (PIP) capacitor, a metal-insulator-metal (MIM) capacitor and a transistor-type capacitor.

Some embodiments according to the present disclosure provide a fingerprint sensor that comprises a first reference capacitor, a second reference capacitor, a first capacitor and a second capacitor. A first reference voltage is established across the first reference capacitor. The first reference voltage is a function of a capacitance detected in response to a touch event, a first reference capacitance of the first reference capacitor and a stray capacitance. The second reference capacitor has a first end and a second end, and is being configured to maintain a voltage difference between the first end and the second end, the voltage difference being a function of the first reference voltage. The first capacitor has a first capacitance and is coupled to the first end of the second reference capacitor. The second capacitor has a second capacitance and is selectively coupled in parallel with the first capacitor. The ratio of the stray capacitance to the first reference capacitance equals the ratio of the second capacitance to the first capacitance.

In an embodiment, the first reference capacitor is configured to receive a first voltage V1, and the first reference voltage V01 is expressed as:

$$V01 = \frac{V1 \times C40}{(C40 + C44 + C42)}$$

where C40, C44 and C42 represent the first reference capacitance, the detected capacitance and the stray capacitance, respectively.

In another embodiment, the first capacitor and the second capacitor are configured to cause a voltage level VA2 at the first end of the second reference capacitor and a voltage level VB2 at the second end of the second reference capacitor to be:

$$VA2 = \frac{V1 \times C80}{(C80 + C82)}, \text{ and}$$

$$VB2 = \frac{V1 \times C80}{(C80 + C82)} - \frac{V1 \times C40}{(C40 + C44 + C42)},$$

respectively,
where C80 and C82 represent the first capacitance and the second capacitance, respectively.

In still another embodiment, a voltage level VB2v at the second end of the second reference capacitor in response to a finger valley contact and a voltage level VB2r at the second end of the second reference capacitor in response to a finger ridge contact are expressed as:

$$VB2v = \frac{V1 \times (C44v + C42)}{(C40 + C44v + C42)} - \frac{V1 \times C82}{(C80 + C82)}, \text{ and}$$

-continued $$VB2r = \frac{V1 \times (C44r + C42)}{(C40 + C44r + C42)} - \frac{V1 \times C82}{(C80 + C82)},$$

respectively,
where C44v and C44r represent a capacitance detected in response to the finger valley contact and a capacitance detected in response to the finger ridge contact, respectively.

In yet another embodiment, the fingerprint sensor further comprises floating electrodes between a substrate and an electrode array including the sensing electrode.

Embodiments according to the present disclosure also provide a sensing electrode to detect a capacitance in response to a touch event, a first reference capacitor configured to selectively receive a voltage, a second reference capacitor having a first end and a second end, the first end selectively coupled to the first reference capacitor, a first capacitor coupled to first end of the second reference capacitor, and a second capacitor selectively coupled in parallel with the first capacitor, wherein the ratio of a stray capacitance associated with the sensing electrode to a first reference capacitance of the first reference capacitor equals the ratio of a second capacitance of the second capacitor to a first capacitance of the first capacitor.

In an embodiment, the fingerprint sensor further comprises a capacitor selectively coupled in parallel with the first reference capacitor, the capacitor representing a capacitance detected in response to the touch event, and a stray capacitor selectively coupled in parallel with the first reference capacitor, the stray capacitor representing the stray capacitance.

In another embodiment, the second end of the second reference capacitor is selectively coupled to ground.

In still another embodiment, the fingerprint sensor further comprises an amplifier selectively coupled between the first reference capacitor and the second reference capacitor. The amplifier includes a source follower.

Although the present invention and its advantages have been described in detail, it should be understood that various changes, substitutions and alterations can be made herein without departing from the spirit and scope of the invention as defined by the appended claims. For example, many of the operations discussed above can be implemented in different methodologies and replaced by other operations, or a combination thereof.

Moreover, the scope of the present application is not intended to be limited to the particular embodiments of the process, machine, methods and steps described in the specification. As one of ordinary skill in the art will readily appreciate from the disclosure of the present invention, processes, machines, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, methods, or steps.

What is claimed is:
1. A fingerprint sensor, comprising:
 a sensing circuit including:
  a sensing electrode to detect a capacitance in response to a touch event; and a first reference capacitor, selectively coupled to the sensing electrode, across which the first reference capacitor a first reference voltage established, the first reference voltage being a function of the capacitance, a first reference capaci- tance of the first reference capacitor and a stray capacitance on the sensing electrode; and
a cancellation circuit selectively coupled to the sensing circuit, the cancellation circuit including:
a second reference capacitor, selectively coupled to the first reference capacitor, across which the second reference capacitor a second reference voltage is established and between a first end and a second end of which the second reference capacitor a voltage difference equal to the second reference voltage is maintained, the second reference voltage being a function of the first reference voltage;
a first capacitor coupled to the first end of the second reference capacitor; and a second capacitor selectively coupled in parallel with the first capacitor and configured to, in conjunction with the first capacitor, distinguish a voltage level at the second end of the second reference capacitor in response to a finger valley contact from a voltage level in response to a finger ridge contact at the second end of the second reference capacitor in the touch event;
wherein the ratio of the stray capacitance to the first reference capacitance equals the ratio of a second capacitance of the second capacitor to a first capacitance of the first capacitor.

2. The fingerprint sensor of claim 1 further comprising an amplifier between the sensing circuit and the cancellation circuit.

3. The fingerprint sensor of claim 1, wherein the second reference voltage equals the first reference voltage.

4. The fingerprint sensor of claim 1, wherein the first reference capacitor is configured to receive a first voltage V1, and the first reference voltage V01 is expressed as:

$$V01 = \frac{V1 \times C40}{(C40 + C44 + C42)}$$

where C40, C44 and C42 represent the first reference capacitance, the capacitance and the stray capacitance, respectively.

5. The fingerprint sensor of claim 4, wherein the first capacitor and the second capacitor are configured to cause a voltage level VA2 at the first end of the second reference capacitor and a voltage level VB2 at the second end of the second reference capacitor to be:

$$VA2 = \frac{V1 \times C80}{(C80 + C82)}, \text{ and}$$

$$VB2 = \frac{V1 \times C80}{(C80 + C82)} - \frac{V1 \times C40}{(C40 + C44 + C42)},$$

respectively,
where C80 and C82 represent a first capacitance of the first capacitor, and a second capacitance of the second capacitor, respectively.

6. The fingerprint sensor of claim 5, wherein a voltage level VB2v at the second end of the second reference capacitor in response to the finger valley contact and a voltage level VB2r at the second end of the second reference capacitor in response to the finger ridge contact are expressed as:

$$VB2v = \frac{V1 \times (C44v + C42)}{(C40 + C44v + C42)} - \frac{V1 \times C82}{(C80 + C82)}, \text{ and}$$

-continued $$VB2r = \frac{V1 \times (C44r + C42)}{(C40 + C44r + C42)} - \frac{V1 \times C82}{(C80 + C82)},$$

respectively,
where C44v and C44r represent a capacitance detected in response to the finger valley contact and a capacitance detected in response to the finger ridge contact, respectively.

7. The fingerprint sensor of claim 1 further comprising floating electrodes between a substrate and an electrode array including the sensing electrode.

8. The fingerprint sensor of claim 1, wherein at least one of the first capacitor or the second capacitor has an adjustable capacitance.

9. The fingerprint sensor of claim 1, wherein the second capacitor includes one of a polysilicon-insulator-polysilicon (PIP) capacitor, a metal-insulator-metal (MIM) capacitor and a transistor-type capacitor.

10. A fingerprint sensor, comprising:
a first reference capacitor across which a first reference voltage is established, the first reference voltage being a function of a capacitance detected in response to a touch event on a sensing electrode, a first reference capacitance of the first reference capacitor and a stray capacitance on the sensing electrode;
a second reference capacitor selectively coupled to the first reference capacitor, the second reference capacitor having a first end and a second end, and being configured to maintain a voltage difference between the first end and the second end, the voltage difference being a function of the first reference voltage;
a first capacitor having a first capacitance and coupled to the first end of the second reference capacitor; and
a second capacitor having a second capacitance and selectively coupled in parallel with the first capacitor,
wherein the ratio of the stray capacitance to the first reference capacitance equals the ratio of the second capacitance to the first capacitance.

11. The fingerprint sensor of claim 10, wherein the first reference capacitor is configured to receive a first voltage V1, and the first reference voltage V01 is expressed as:

$$V01 = \frac{V1 \times C40}{(C40 + C44 + C42)},$$

where C40, C44 and C42 represent the first reference capacitance, the detected capacitance and the stray capacitance, respectively.

12. The fingerprint sensor of claim 11, wherein the first capacitor and the second capacitor are configured to cause a voltage level VA2 at the first end of the second reference capacitor and a voltage level VB2 at the second end of the second reference capacitor to be:

$$VA2 = \frac{V1 \times C80}{(C80 + C82)}, \text{ and}$$

$$VB2 = \frac{V1 \times C80}{(C80 + C82)} - \frac{V1 \times C40}{(C40 + C44 + C42)},$$

respectively,
where C80 and C82 represent the first capacitance and the second capacitance, respectively.

13. The fingerprint sensor of claim 12, wherein a voltage level VB2v at the second end of the second reference capacitor in response to a finger valley contact and a voltage level VB2r at the second end of the second reference capacitor in response to a finger ridge contact are expressed as:

$$VB2v = \frac{V1 \times (C44v + C42)}{(C40 + C44v + C42)} - \frac{V1 \times C82}{(C80 + C82)}, \text{ and}$$

$$VB2r = \frac{V1 \times (C44r + C42)}{(C40 + C44r + C42)} - \frac{V1 \times C82}{(C80 + C82)},$$

respectively,
where C44v and C44r represent a capacitance detected in response to the finger valley contact and a capacitance detected in response to the finger ridge contact, respectively.

14. The fingerprint sensor of claim 10 further comprising floating electrodes between a substrate and an electrode array including the sensing electrode.

15. The fingerprint sensor of claim 10, wherein at least one of the first capacitor or the second capacitor has an adjustable capacitance.

16. A fingerprint sensor, comprising:
a sensing electrode to detect a capacitance in response to a touch event;
a first reference capacitor configured to selectively receive a voltage;
a second reference capacitor selectively coupled to the first reference capacitor, the second reference capacitor having a first end and a second end, the first end selectively coupled to the first reference capacitor;
a first capacitor coupled to first end of the second reference capacitor; and
a second capacitor selectively coupled in parallel with the first capacitor,
wherein the ratio of a stray capacitance on the sensing electrode to a first reference capacitance of the first reference capacitor equals the ratio of a second capacitance of the second capacitor to a first capacitance of the first capacitor.

17. The fingerprint sensor of claim 16 further comprising:
a capacitor selectively coupled in parallel with the first reference capacitor, the capacitor representing a capacitance detected in response to the touch event; and
a stray capacitor selectively coupled in parallel with the first reference capacitor, the stray capacitor representing the stray capacitance.

18. The fingerprint sensor of claim 16, wherein the second end of the second reference capacitor is selectively coupled to ground.

19. The fingerprint sensor of claim 16 further comprising an amplifier selectively coupled between the first reference capacitor and the second reference capacitor.

* * * * *